US012688072B2

(12) United States Patent
Nilsson

(10) Patent No.: US 12,688,072 B2
(45) Date of Patent: Jul. 21, 2026

(54) CAMERA SYSTEM AND METHOD OF CONTROLLING A COMPUTING HARDWARE ACCELERATOR

(71) Applicant: Axis AB, Lund (SE)

(72) Inventor: Martin Nilsson, Lund (SE)

(73) Assignee: Axis AB, Lund (SE)

( * ) Notice: Subject to any disclaimer, the term of this patent is extended or adjusted under 35 U.S.C. 154(b) by 409 days.

(21) Appl. No.: 18/493,066

(22) Filed: Oct. 24, 2023

(65) Prior Publication Data

US 2024/0168815 A1 May 23, 2024

(30) Foreign Application Priority Data

Nov. 18, 2022 (EP) .................................... 22208207

(51) Int. Cl.
| | |
|---|---|
| *G06F 9/50* | (2006.01) |
| *G06F 21/62* | (2013.01) |
| *G06T 7/20* | (2017.01) |

(52) U.S. Cl.
CPC ........ G06F 9/5044 (2013.01); G06F 21/6254 (2013.01); G06T 7/20 (2013.01)

(58) Field of Classification Search
CPC ...... G06F 9/5044; G06F 21/6254; G06T 7/20
See application file for complete search history.

(56) References Cited

U.S. PATENT DOCUMENTS

| | | | | |
|---|---|---|---|---|
| 2016/0219241 A1* | 7/2016 | Korneliussen | ......... | H04N 19/23 |
| 2018/0054611 A1* | 2/2018 | Shin | ...................... | H04N 13/344 |
| 2019/0138822 A1* | 5/2019 | Yao | ........................ | G01S 17/931 |
| 2022/0122294 A1* | 4/2022 | Nyström | .............. | H04N 19/132 |
| 2022/0156566 A1* | 5/2022 | Jeon | ..................... | G06N 3/0464 |
| 2023/0056672 A1* | 2/2023 | Kim | ........................ | G06V 10/82 |

OTHER PUBLICATIONS

European Search Report issued on Apr. 12, 2023 for European Patent Application No. 22208207.5.

* cited by examiner

*Primary Examiner* — Sisley N Kim
(74) *Attorney, Agent, or Firm* — Volpe Koenig

(57) ABSTRACT

A computer-implemented method of controlling a computing hardware accelerator in a movable camera comprises: acquiring images from the movable camera; obtaining an indication of a physical state of the movable camera, indicating whether the movable camera is in a moving state or in a still state; and allocating exclusive access to the computing hardware accelerator based on the indication of the physical state. The disclosure further relates to a camera system for carrying out the computer-implemented method of controlling a computing hardware accelerator in a movable camera.

15 Claims, 3 Drawing Sheets

300

303a

303c

303b

303d

CAMERA SYSTEM AND METHOD OF CONTROLLING A COMPUTING HARDWARE ACCELERATOR

The present disclosure relates to a computer-implemented method of controlling a computing hardware accelerator in a movable camera. The disclosure further relates to a camera system for carrying out the computer-implemented method of controlling a computing hardware accelerator in a movable camera.

BACKGROUND

Hardware acceleration is the use of computer hardware designed to perform specific functions more efficiently when compared to software running on a general-purpose central processing unit (CPU). Typical advantages that are achieved using hardware accelerators compared to a CPU are increased speed and reduced energy consumption of specific operations. Disadvantages of hardware accelerator include that they are less flexible and optimized to perform only a limited number of tasks efficiently. Developing a hardware accelerator for specific tasks may involve significant costs and resources. Once the hardware accelerator has been implemented in silicon, it may require a re-design to update the functionality or correct errors. Hardware accelerators include, for example, application-specific integrated circuits (ASIC) and graphics processing units (GPU).

Adding hardware accelerators to cameras is typically expensive, at least compared to using only general purpose CPUs. It would therefore be useful to be able to use as few hardware accelerators as possible in a camera, preferably only one hardware accelerator. There are, however, a number of computing tasks in a camera or camera system that can benefit from hardware acceleration. For some tasks it may even be a requirement that they are performed using a hardware accelerator in order to be carried out fast enough for certain applications.

However, allowing several camera-related processes to share one hardware accelerator is often difficult. Such sharing may not be supported by the hardware accelerator and/or may require complex scheduling of tasks, which, in the end, may cause delays in carrying out the tasks. There is thus a need for a solution of using a limited number of hardware accelerators, such as one hardware accelerator, in a camera, more efficiently.

SUMMARY

The present disclosure relates to an improved computer-implemented method for sharing a computing hardware accelerator in a movable camera. More specifically, a first aspect of the present disclosure relates to a computer-implemented method of controlling a computing hardware accelerator in a movable camera, the method comprising:
  acquiring images from the movable camera;
  obtaining an indication of a physical state of the movable camera, indicating whether the movable camera is in a moving state or in a still state;
  allocating exclusive access to the computing hardware accelerator, wherein:
    if the movable camera is in the moving state, allocating the computing hardware accelerator to a first processing workload related to the acquired images and associated with the moving state; and
    if the movable camera is in the still state, allocating the computing hardware accelerator to a second processing workload related to the acquired images and associated with the still state.

A movable camera in the context of the present application means a camera that is capable of directional control to capture images from several areas. One example of such a camera is a Pan Tilt Zoom (PTZ) camera, which may typically be used for monitoring or surveillance applications.

Modern cameras include a range of image processing tasks. In certain cameras there are not only purely image-related processing, such as color corrections, edge enhancement, filtering etc., but also, for example, various video analytics processing, privacy masking of certain areas of the images and adding overlay text or graphics in the images.

The inventor has realized that the physical state of the movable camera, more specifically an indication whether the movable camera is in a moving state or in a still state, can be used to control a computing hardware accelerator in a movable camera to perform different specific tasks related to the acquired images. By using an indication of movement of the movable camera as system condition, the system can switch between accelerating a first processing workload, such as privacy masking, and a second processing workload, such as computations related to video analytics, using the same computing hardware accelerator. This can enable high performance for both tasks while saving the costs of additional computing hardware accelerators.

'Controlling' the computing hardware accelerator in a movable camera in this context means the necessary steps to make the computing hardware accelerator perform the tasks. This may include, but is not limited to, enabling or starting a process, sending or routing relevant input data for the process to the computing hardware accelerator. It may also involve interrupting another ongoing process in the computing hardware accelerator.

If the movable camera is in the moving state, the method allocates the computing hardware accelerator to a first processing workload related to the acquired images and associated with the moving state. If the movable camera is in the still state, the method allocates the computing hardware accelerator to a second processing workload related to the acquired images and associated with the still state. One example of a task for which processing time is often critical for a moving state is computation of one or more privacy masks in the images acquired by the movable camera. If certain areas of the images need to be masked, for example, for safety, regulatory or privacy reasons, these privacy masks need to be updated in substantially real-time if the camera moves. When the camera does not move, the masks either do not have to be updated, or can be updated less frequently, which can be handled by a general-purpose CPU. In the still state, the computing hardware accelerator can be used to perform analytics computations related to the images acquired by the movable camera. This can relate to various tasks, for example, identification of objects and various processing tasks related to, for example, visual augmented reality by adding computer-generated content to the acquired images in a way that they match the acquired images.

The present disclosure further relates to a camera system, comprising:
  a movable camera;
  a computing hardware accelerator; and
  a central processing unit, wherein the central processing unit is configured to:
    acquire images from the movable camera;

obtain an indication of a physical state of the movable camera, indicating whether the movable camera is in a moving state or in a still state;

allocate exclusive access to the computing hardware accelerator, wherein:

if the movable camera is in the moving state, allocate the computing hardware accelerator to a first processing workload related to the acquired images and associated with the moving state; and if the movable camera is in the still state, allocate the computing hardware accelerator to a second processing workload related to the acquired images and associated with the still state.

A person skilled in the art will recognize that the presently disclosed computer-implemented method for sharing a computing hardware accelerator in a movable camera may be performed using any embodiment of the presently disclosed camera system, and vice versa.

BRIEF DESCRIPTION OF DRAWINGS

Various embodiments are described hereinafter with reference to the drawings. The drawings are examples of embodiments and are intended to illustrate some of the features of the presently disclosed computer-implemented method for sharing a computing hardware accelerator in a movable camera, and are not limiting to the presently disclosed method and system.

DETAILED DESCRIPTION

The present disclosure relates to a computer-implemented method of controlling a computing hardware accelerator in a movable camera. The method comprises the steps of acquiring images from the movable camera and obtaining an indication of a physical state of the movable camera. The indication of the physical state can be obtained in several ways. For example, a general-purpose CPU may control the movement of the movable camera, for example by controlling a mechanical actuator of the camera, and may therefore provide such an indication directly. It may also be possible to measure if the movable camera moves or not. The presently disclosed method is not limited to specific ways of providing this information. Based on the indication of the physical state the method then allocates exclusive access to the computing hardware accelerator.

If the movable camera is in the moving state, the method allocates the computing hardware accelerator to a first processing workload related to the acquired images and associated with the moving state. If the movable camera is in the still state, the method allocates the computing hardware accelerator to a second processing workload related to the acquired images and associated with the still state.

A 'workload' may be defined as a program or application that runs on a computer, usually in a series of instructions.

A workload can be a simple program or a complex program. A workload in the context of the present disclosure can be a process that a central processing unit either performs itself or assigns to the computing hardware accelerator. The process can be a defined sequence of tasks with an end or a continuous ongoing series of tasks without end. A computer program or application may comprise one workload. It is also possible that the computer program or application comprises additional workloads. This means that one workload of the program/application may be configured to run on a general-purpose central processing unit and other workload(s) may be configured to run on a computing hardware accelerator.

Figure 1:
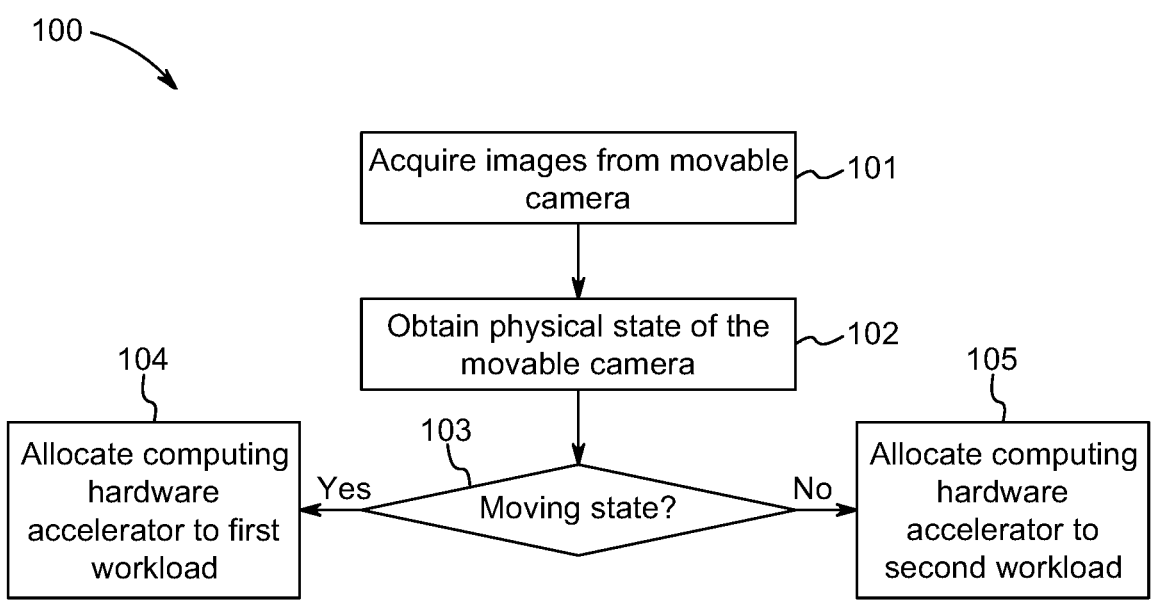
FIG. 1 shows a flow chart of a method according to an embodiment of the presently disclosed computer-implemented method for sharing a computing hardware accelerator in a movable camera.

FIG. 1 shows a flow chart of a method according to an embodiment of the presently disclosed computer-implemented method (100) for sharing a computing hardware accelerator in a movable camera. The non-limiting embodiment comprises the steps of acquiring (101) images from the movable camera and obtaining (102) an indication of a physical state of the movable camera. Based on whether the movable camera is in a moving state or still state (103), the method either allocates (104) the computing hardware accelerator to a first processing workload related to the acquired images and associated with the moving state, or allocates (105) the computing hardware accelerator to a second processing workload related to the acquired images and associated with the still state.

The present disclosure makes reference to a 'computing hardware accelerator'. The computing hardware accelerator can thereby be seen as a processing unit specialized in carrying out certain processing tasks or groups of processing tasks. In the present disclosure the computing hardware accelerator will typically be designed for performing computations related to the images acquired by the camera. The computing hardware accelerator may, however, not necessarily render the images to be displayed. As will be described in further detail, there are, generally, certain computations associated with the images acquired from the movable camera. Generally, a person skilled in the art would be considered to understand the difference between a hardware accelerator and a general-purpose processing unit. For example, a hardware accelerator may include one or more of the following hardware accelerators: graphics processing unit, digital signal processor, AI and/or machine learning accelerator, network processor. For the presently disclosed computer-implemented method of controlling a computing hardware accelerator in a movable camera one may also consider the actual processing that is carried out. The processing unit(s) carrying out a main part of the general processing tasks may be considered to be a general-purpose CPU in this regard.

The indication of the physical state of the movable camera may be obtained continuously or at intervals. Since a general-purpose CPU may already control the movement of the movable camera, the presently disclosed method may obtain the indication of the physical state directly from such a general-purpose CPU. The inventor has realized that the allocation of the computing hardware accelerator can be allocated to tasks that are mutually exclusive with respect to if the camera is in movement or not. Two groups of computing or processing tasks may thereby share the same computing hardware accelerator. The method may comprise the step of automatically switching between allocating the computing hardware accelerator to the first processing workload and allocating the computing hardware accelerator to the second processing workload based on the physical state. This may be done, for example, by a general-purpose CPU.

A movable camera in the context of the present application means a camera that is capable of directional control to capture images from several areas. The camera may comprise a mount with a movable part that can turn the camera and a fixed part, which can be mounted on, for example, a wall, a post, or any other suitable item. The term 'movable' in the context of the present disclosure does not refer to the fact that any camera in principle can be moved from one place to another. One example of a 'movable' camera is a Pan Tilt Zoom (PTZ) camera, which may typically be used for monitoring or surveillance applications. A PTZ camera is a camera that is capable of directional and zoom control. A PTZ camera uses optical zoom and motors to physically adjust the camera's aim and zoom. According to one embodiment of the presently disclosed computer-implemented method of controlling a computing hardware accelerator in a movable camera, as well as the presently disclosed camera system, the movable camera is a pan-tilt or a pan-tilt-zoom camera. The movable camera may be any camera that is capable of mechanical movement to change the area from which images are acquired. An indication of a 'moving state' of the movable camera usually means that there is ongoing mechanical movement of the movable camera.

The first processing workload is related to the acquired images and associated with the moving state. This first processing workload being associated with the moving state may have the meaning that it is an operation that is done on a plurality of images, such as a continuous image sequence that form a video. In such a sequence of images, when there is movement of the camera, the plurality of images will not show exactly the same area. Objects in the images may also move between the images. The first processing workload being "related to the acquired images" may be construed broadly to include not only workloads for doing or applying something directly with/to the images themselves but also workloads that can, more generally, be said to be "related" to the images in the sense that the workload is applied on, for example image data or additional information captured at the same time as the images. Examples of such workloads include image data compression and encryption. In one embodiment of the presently disclosed computer-implemented method of controlling a computing hardware accelerator in a movable camera, the first processing workload comprises computation of graphics in the images acquired by the movable camera. More specifically, the first processing workload may comprise computation of one or more privacy masks in the images acquired by the movable camera. A privacy mask may be static or dynamic. A static privacy mask is usually created by an operator marking the area to be masked on the image in a graphical user interface. The static privacy mask then stays in place until the operator decides to move or remove it. A dynamic privacy mask may change over time. Similar to a dynamic privacy mask, the operator may mark an area in the image where masking is desired. The operator may also input settings determining when the privacy mask should be applied. For instance, the operator could draw a rectangle around a window in the image, and make settings such that if a face is detected within the marked area, that face will be masked out. Such dynamic privacy masks may be beneficial in that as long as the conditions set for the privacy mask are not fulfilled, there is no mask blocking the view, but as soon as, for example, a face detection algorithm, an object detection algorithm or a motion detection algorithm detects that the conditions are fulfilled, the privacy mask is applied. Privacy masks may be applied to the image as an overlay. Some privacy masks take the form of a black or otherwise coloured, opaque area. Other privacy masks take the form of blurring, where image data is "smeared" out over the privacy mask area, or pixelization, where the image inside the privacy mask is divided into pixelization blocks and all pixels of a pixelization block are given the same value, such that the image appears blocky inside the privacy mask area. The privacy mask is in many cases a rectangle, or it may be another polygon, or have any other shape more closely following the shape of the area to occlude. When there is movement of the camera, the images in the sequence of images will not show exactly the same area. This means that the privacy masks, which typically cover fixed or movable objects in the images, will have to be recomputed continuously. In one embodiment of the presently disclosed computer-implemented method of controlling a computing hardware accelerator in a movable camera, the computation of one or more privacy masks comprises dynamically computing an area and/or a selection of pixels and/or polygons to be blurred and/or covered and/or anonymized in the images acquired by the movable camera. It shall be noted that the final rendering of the images that are presented to a viewer does not necessarily have to be rendered by the computing hardware accelerator. The output of the computation of one or more privacy masks may be a list of polygons described as a list of coordinates in the images.

Figure 3A:
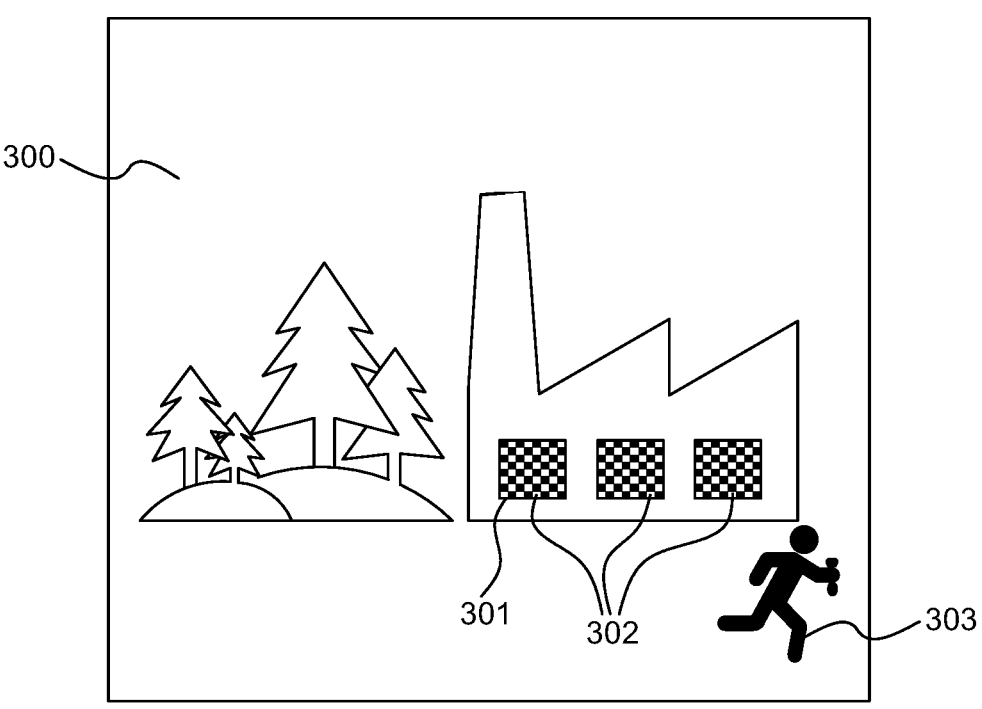
FIGS. 3A and 3B show an example of privacy masks in the images acquired by a moving camera.
Figure 3B:
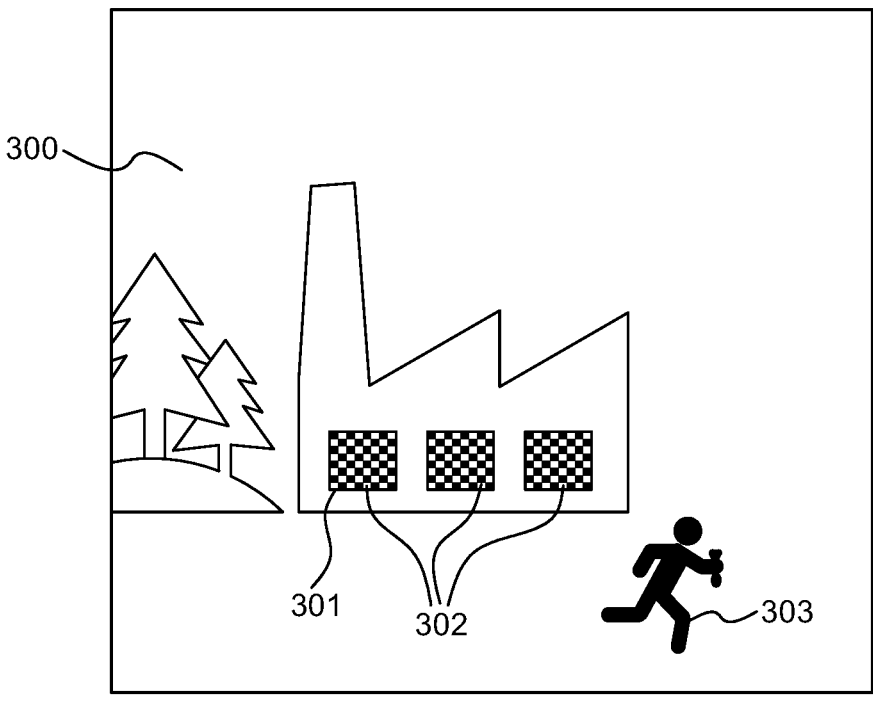

FIG. 3 shows an example of privacy masks (302) in the images (300) acquired by a moving camera. FIG. 3A shows a building having windows (301). A window on a building is an example of object that often needs to be protected by a privacy mask. Monitoring camera in a public place may have requirements that windows shall be blurred or covered in images that are sent or presented to users. Other items or persons, for example the person (303) in FIG. 3A, may also be covered by privacy masks. In FIG. 3B, it can be seen that the camera has been slightly moved. The trees and the building have been shifted to the left in the image, which indicates that the camera has been turned to the right. If the two images of FIGS. 3A and 3B were part of a sequence of image, one would obtain an indication that the movable camera is in a moving state. As can be seen, there is also movement in the images. The person (303) has changed position relative to the building (301) between the two images.

The second processing workload is related to the acquired images and associated with the still state. The second processing workload being "related to the acquired images" may be construed broadly to include not only workloads for doing or applying something directly with/to the images themselves but also workloads that can, more generally, be said to be "related" to the images in the sense that the workload is applied on, for example image data or additional information captured at the same time as the images. Examples of such workloads include analysis of sound captured along with the capturing of images. In one embodiment of the presently disclosed computer-implemented method of controlling a computing hardware accelerator in a movable camera, the second processing workload comprises analytics computations related to the images acquired by the movable camera. The analytics computations may be video analytics computations. When the camera does not move, the computing hardware accelerator can be used for high-performance analytics, such as scanning the images and identifying objects or persons. The analytics computations may also involve the use of trained machine learning models, such as deep learning and/or neural network based models trained to, for example, categorizing or recognizing objects. The second processing workload may therefore comprise applying a machine learning model trained to perform a specific image and/or video analysis workload on the images acquired by the movable camera. The analytics computations may further comprise computations related to object detection in the images acquired by the movable camera. The second processing workload may also comprise computations related to augmented reality content to be added to the images acquired by the movable camera. The computations may be used to provide overlay that can be added to the images. Examples of such overlay include adding street names, mark certain areas or objects, optionally with text explaining or stating what the object is, indicating that something is supposed to be behind a wall, providing information about the temperature of an object or area etc.

Figure 4:
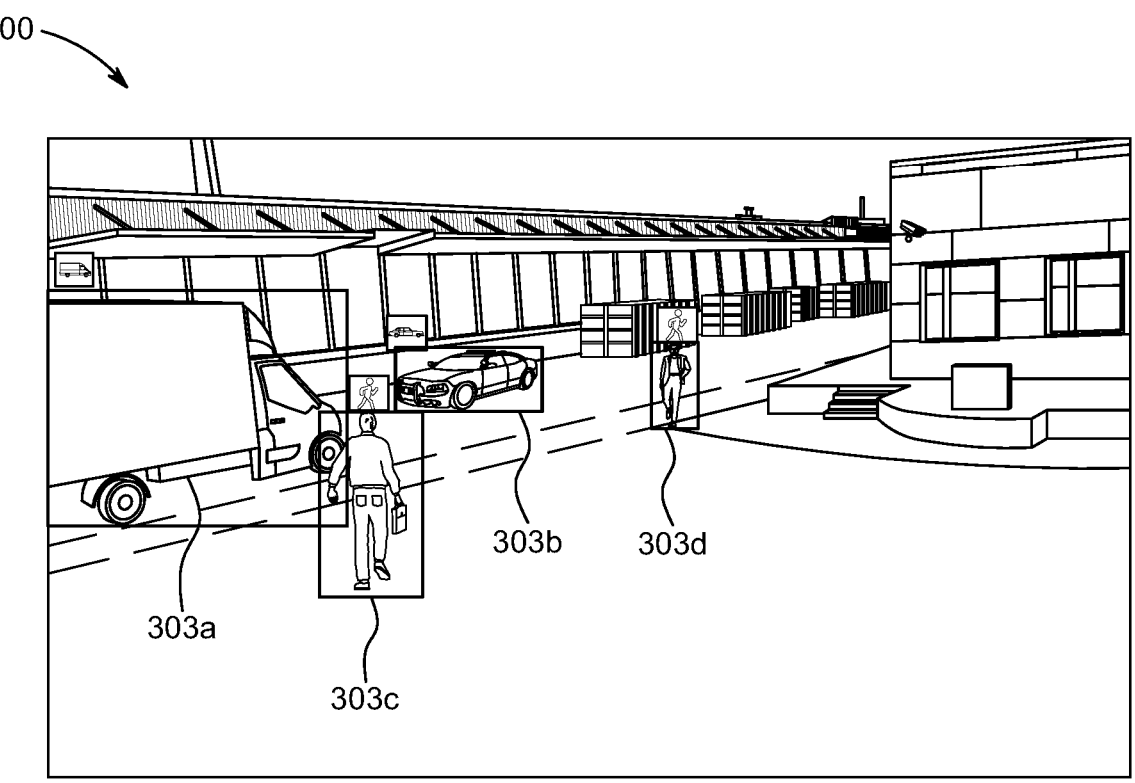
FIG. 4 shows an example of an image acquired by a moving camera in a still state, where objects have been identified using the computing hardware accelerator and where information has been added to the image.

FIG. 4 shows an example of an image (300) acquired by a movable camera in a still state, where objects (303) have been identified using the computing hardware accelerator and where information has been added to the image. In the example of FIG. 4, the second processing workload has identified a truck (303a), a car (303b) and two persons (303c; 303d). For each of the identified items (303a; 303b; 303c; 303d), the item (303a; 303b; 303c; 303d) has been highlighted by adding a frame to it. Symbols have also been added to the image (300), the symbols indication what kind of item that has been identified, in this case a truck (303a), a car (303b) and two persons (303c; 303d).

In addition to only obtaining an indication of whether the movable camera is in a moving state or in a still state, the presently disclosed computer-implemented method of controlling a computing hardware accelerator in a movable camera may receive further information about a movement direction and/or movement speed of the movable camera. The first processing workload or the second processing workload may be adapted based on the movement direction and/or movement speed. As an example, the first processing workload may use the information for predicting future positions of privacy masks.

The present disclosure further relates to a computer program having instructions which, when executed by a computing device or computing system, cause the computing device or computing system to carry out any embodiment of the presently disclosed method of controlling a computing hardware accelerator in a movable camera. The computer program may be stored on any suitable type of storage media, such as non-transitory storage media.

The present disclosure further relates to a camera system, comprising:

a movable camera;

a computing hardware accelerator; and a central processing unit, wherein the central processing unit is configured to:

acquire images from the movable camera;

obtain an indication of a physical state of the movable camera, indicating whether the movable camera is in a moving state or in a still state;

allocate exclusive access to the computing hardware accelerator, wherein:

if the movable camera is in the moving state, allocate the computing hardware accelerator to a first processing workload related to the acquired images and associated with the moving state; and if the movable camera is in the still state, allocate the computing hardware accelerator to a second processing workload related to the acquired images and associated with the still state.

Figure 2:
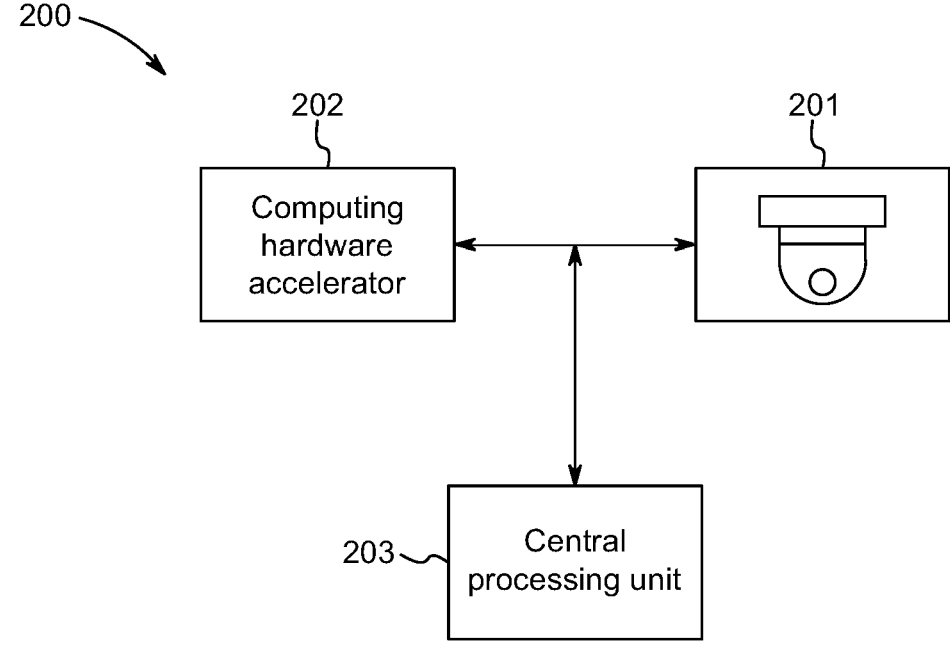
FIG. 2 shows a schematic view of an embodiment of the presently disclosed camera system.

FIG. 2 shows a schematic view of an embodiment of the presently disclosed camera system (200). The camera system (200) comprises a movable camera (201), a computing hardware accelerator (202) and a central processing unit (203).

The camera system may further comprise peripheral components, such as one or more memories, which may be used for storing instructions that can be executed by any of the processors. The camera system may further comprise internal and external network interfaces, input and/or output ports, a keyboard or mouse etc.

As would be understood by a person skilled in the art, a processing unit also may be a single processor in a multi-core/multiprocessor system. Both the computing hardware accelerator and the central processing unit may be connected to a data communication infrastructure.

The camera system may include a memory, such as a random access memory (RAM) and/or a read-only memory (ROM), or any suitable type of memory. The camera system may further comprise a communication interface that allows software and/or data to be transferred between the system and external devices. Software and/or data transferred via the communications interface may be in any suitable form of electric, optical or RF signals. The communications interface may comprise, for example, a cable or a wireless interface.

The invention claimed is:

1. A computer-implemented method of controlling a computing hardware accelerator in a movable camera, the method comprising:

acquiring images from the movable camera;

obtaining an indication of a physical state of the movable camera, indicating whether the movable camera is in a moving state or in a still state;

allocating exclusive access to the computing hardware accelerator based on the indication of the physical state of the movable camera, wherein:

if the movable camera is in the moving state, allocating the computing hardware accelerator to a first processing workload related to the acquired images and associated with the moving state; and if the movable camera is in the still state, allocating the computing hardware accelerator to a second processing workload related to the acquired images and associated with the still state, wherein the first processing workload and the second processing workload are mutually exclusive with respect to the physical state of the movable camera and are each accelerated by the same computing hardware accelerator.

2. The method of claim 1, wherein the first processing workload comprises computation of graphics in the images acquired by the movable camera.

3. The method of claim 1, wherein the first processing workload comprises computation of one or more privacy masks in the images acquired by the movable camera.

4. The method of claim 3, wherein the computation of one or more privacy masks comprises dynamically computing an area and/or a selection of pixels and/or polygons to be blurred and/or covered and/or anonymized in the images acquired by the movable camera.

5. The method of claim 1, wherein the second processing workload comprises analytics computations related to the images acquired by the movable camera.

6. The method of claim 5, wherein the analytics computations comprise computations related to object detection in the images acquired by the movable camera.

7. The method of claim 1, wherein the second processing workload comprises computations related to augmented reality content to be added to the images acquired by the movable camera.

8. The method of claim 1, wherein the second processing workload comprises applying a machine learning model trained to perform a specific image and/or video analysis workload on the images acquired by the movable camera.

9. The method of claim 1, wherein the indication of the physical state of the movable camera is obtained continuously or at intervals.

10. The method of claim 1, further comprising the step of automatically switching between allocating the computing hardware accelerator to the first processing workload and allocating the computing hardware accelerator to the second processing workload based on the indication of the physical state.

11. The method of claim 1, wherein the movable camera is a pan-tilt or a pan-tilt-zoom camera.

12. The method of claim 1, wherein the moving state of the movable camera indicates mechanical movement of the movable camera.

13. The method of claim 1, wherein the indication of the physical state further comprises information about a movement direction and/or movement speed of the movable camera, and wherein the first processing workload or the second processing workload is adapted based on the movement direction and/or movement speed.

14. A non-transitory computer readable recording medium comprising a computer program having instructions which, when executed by a computing device or computing system, cause the computing device or computing system to carry out a method of controlling a computing hardware accelerator in a movable camera, the method comprising:

acquiring images from the movable camera;

obtaining an indication of a physical state of the movable camera, indicating whether the movable camera is in a moving state or in a still state;

allocating exclusive access to the computing hardware accelerator based on the indication of the physical state of the movable camera, wherein:

if the movable camera is in the moving state, allocating the computing hardware accelerator to a first processing workload related to the acquired images and associated with the moving state; and if the movable camera is in the still state, allocating the computing hardware accelerator to a second processing workload related to the acquired images and associated with the still state, wherein the first processing workload and the second processing workload are mutually exclusive with respect to the physical state of the movable camera and are each accelerated by the same computing hardware accelerator.

15. A camera system, comprising:

a movable camera;

a computing hardware accelerator; and a central processing unit, wherein the central processing unit is configured to:

acquire images from the movable camera;

obtain an indication of a physical state of the movable camera, indicating whether the movable camera is in a moving state or in a still state;

allocate exclusive access to the computing hardware accelerator based on the indication of the physical state of the movable camera, wherein:

if the movable camera is in the moving state, allocate the computing hardware accelerator to a first processing workload related to the acquired images and associated with the moving state; and if the movable camera is in the still state, allocate the computing hardware accelerator to a second processing workload related to the acquired images and associated with the still state, wherein the first processing workload and the second processing workload are mutually exclusive with respect to the physical state of the movable camera and are each accelerated by the same computing hardware accelerator.

* * * * *